US010003949B2

(12) United States Patent
Iko

(10) Patent No.: US 10,003,949 B2
(45) Date of Patent: Jun. 19, 2018

(54) COMMUNICATION APPARATUS CAPABLE OF COMMUNICATING WITH EXTERNAL APPARATUS, CONTROL METHOD FOR COMMUNICATION APPARATUS, AND RECORDING MEDIUM

(71) Applicant: CANON KABUSHIKI KAISHA, Tokyo (JP)

(72) Inventor: Takumi Iko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 14/875,303

(22) Filed: Oct. 5, 2015

(65) Prior Publication Data

US 2016/0105796 A1 Apr. 14, 2016

(30) Foreign Application Priority Data

Oct. 8, 2014 (JP) ................................ 2014-207451

(51) Int. Cl.

*H04W 4/00* (2018.01)
*H04W 76/02* (2009.01)
*H04W 88/06* (2009.01)
*H04W 84/12* (2009.01)

(Continued)

(52) U.S. Cl.

CPC ............. *H04W 4/80* (2018.02); *H04W 4/008* (2013.01); *H04W 76/021* (2013.01); *H04W 76/11* (2018.02); *H04L 61/2015* (2013.01); *H04W 76/023* (2013.01); *H04W 76/14* (2018.02);

(Continued)

(58) Field of Classification Search

None

See application file for complete search history.

(56) References Cited

U.S. PATENT DOCUMENTS

2006/0208088 A1* 9/2006 Sekiguchi ............ G06K 7/1095 235/472.02
2014/0240764 A1* 8/2014 Itogawa ................ G06F 3/1236 358/1.15

(Continued)

FOREIGN PATENT DOCUMENTS

JP 2013-157736 A 8/2013

*Primary Examiner* — Chi H Pham
*Assistant Examiner* — Fahmida Chowdhury
(74) *Attorney, Agent, or Firm* — Canon U.S.A., Inc. IP Division

(57) ABSTRACT

A communication apparatus includes a first communication unit that communicates with an external apparatus using a first wireless communication, a second communication unit that communicates with the external apparatus using a second wireless communication, and a control unit, wherein in a case where the communication with the external apparatus is performed using the first wireless communication in response to an acceptance of an instruction, the control unit controls the first communication unit to communicate with the external apparatus with an identifier that is different for each connection, and wherein in a case where the communication with the external apparatus is performed using the first wireless communication in response to the communication with the external apparatus by the second communication unit, the control unit controls the first communication unit to communicate with the external apparatus with a predetermined identifier for each connection.

18 Claims, 9 Drawing Sheets

(51) Int. Cl.
*H04L 29/12* (2006.01)
*H04W 84/18* (2009.01)

(52) U.S. Cl.
CPC ............ *H04W 84/12* (2013.01); *H04W 84/18* (2013.01); *H04W 88/06* (2013.01)

(56) References Cited

U.S. PATENT DOCUMENTS

| | | | | | |
|---|---|---|---|---|---|
| 2014/0287733 | A1* | 9/2014 | Mach | H04W 52/0258 | 455/418 |
| 2015/0172435 | A1* | 6/2015 | Choi | H04M 1/7253 | 455/418 |
| 2016/0037564 | A1* | 2/2016 | Borden | H04W 12/08 | 370/254 |

* cited by examiner

[CONNECT FROM MENU]

[CONNECT FROM MENU]

[NFC TOUCH CONNECTION]

| | | |
|---|---|---|
| DIGITAL CAMERA TYPE INFORMATION | PRODUCT TYPE | 601 |
| | GENERATION INFORMATION | 602 |
| | MODEL ID | 603 |
| | GUID | 604 |
| | STATUS INFORMATION | 605 |
| | ⋮ | |
| INFORMATION ABOUT APPLICABLE APPLICATION | PACKAGE NAME | 606 |
| SIMPLE AP INFORMATION | SSID | 607 |
| | SecurityKey | 608 |
| | ⋮ | |
| ⋮ | | |

600

| | | |
|---|---|---|
| APPLICATION INFORMATION | APPLICATION ID | 611 |
| | GUID | 612 |
| | ⋮ | |
| SIMPLE AP INFORMATION | SSID | 613 |
| | SecurityKey | 614 |
| | ⋮ | |
| ⋮ | | |

610

COMMUNICATION APPARATUS CAPABLE OF COMMUNICATING WITH EXTERNAL APPARATUS, CONTROL METHOD FOR COMMUNICATION APPARATUS, AND RECORDING MEDIUM

BACKGROUND

Field

Aspects of the present invention generally relate to a communication apparatus that communicates with another apparatus through wireless communication.

Description of the Related Art

In recent years, digital cameras capable of connecting to a mobile phone through a wireless local area network (LAN) and exchanging image data therewith have been known. In order to omit part of the procedure of the user operation for the connection through the wireless communication, there has been known a technique (handover process) in which communication parameters used for the connection through the wireless communication are shared using another wireless communication. For example, Japanese Patent Application Laid-Open No. 2013-157736 discusses a technique in which the communication parameters used for connecting devices through the wireless LAN are shared among the devices using Near Field Communication (NFC).

Some communication apparatuses capable of using the wireless LAN save the used communication parameters to make it easier for the user to connect to the wireless LAN for the next time. In the next connection, the user may be only required to select the past communication parameters.

Wireless communication is intercepted more easily than wired communication. Wireless communication is therefore required to have higher security. The higher security can be obtained by, for example, making the communication parameters include the different service set identifier (SSID) every time the wireless LAN is established. The wireless LAN connection using the NFC allows a easy connection but, on the other hand, leaves a long history of connections. The longer history of connections causes a user to take time and effort to find a desired SSID.

SUMMARY

According to an aspect of the present invention, a communication apparatus includes a first communication unit configured to communicate with an external apparatus through a network using a first wireless communication, a second communication unit configured to communicate with the external apparatus using a second wireless communication, which is different from the first wireless communication, an acceptance unit configured to accept an instruction for communicating with the external apparatus by the first communication unit, and a control unit configured to control the communication with the external apparatus by using the first communication unit, wherein in a case where the communication with the external apparatus is performed using the first wireless communication in response to acceptance of the instruction with a predetermined operation, the control unit controls the first communication unit to communicate with the external apparatus with an identifier that is different for each connection, and wherein in a case where the communication with the external apparatus is performed using the first wireless communication in response to the communication with the external apparatus by the second communication unit, the control unit controls the first communication unit to communicate with the external apparatus with a predetermined identifier for each connection.

Further features of the present disclosure will become apparent from the following description of exemplary embodiments with reference to the attached drawings.

DESCRIPTION OF THE EMBODIMENTS

A first exemplary embodiment for carrying out aspects of the present invention is hereinafter described with reference to the attached drawings.

The present exemplary embodiment described below is merely an example for achieving aspects of the present invention, and modifications and changes are possible according to the configurations and conditions of the apparatus to which aspects of the present invention are applied. The present exemplary embodiment described below can be combined with another exemplary embodiment.

<Configuration of Digital Camera 100>

Figure 1A:
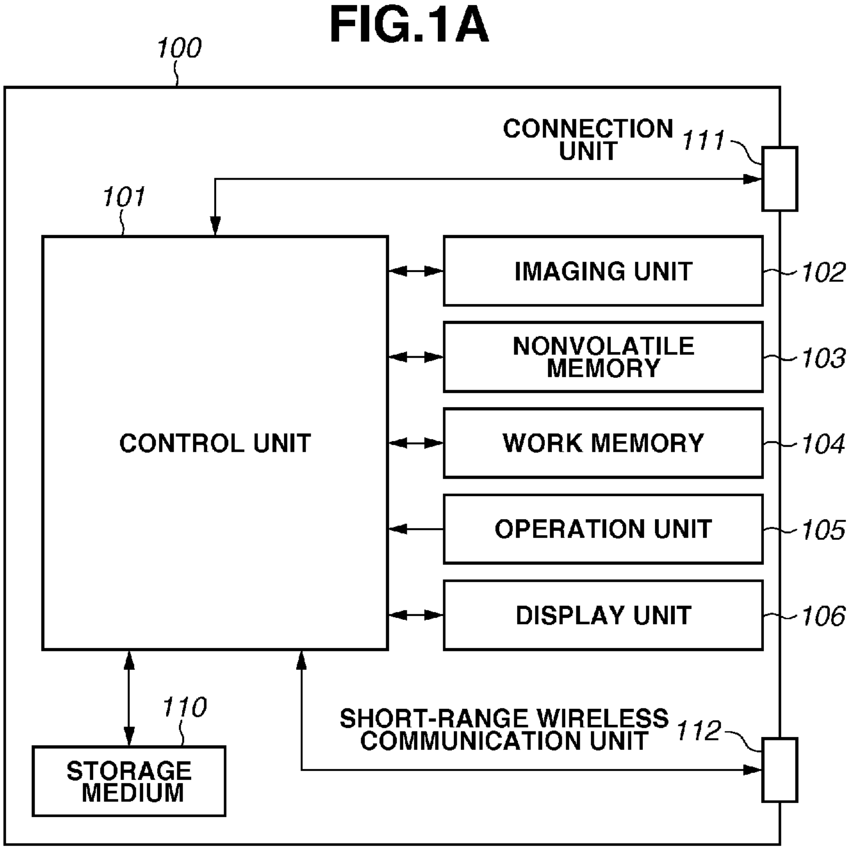
FIG. 1A is a block diagram of a digital camera according to a first exemplary embodiment.

FIG. 1A is a block diagram illustrating a configuration example of a digital camera 100 serving as an example of a communication apparatus according to the present exemplary embodiment. Although the digital camera is employed as an example of the communication apparatus in the present exemplary embodiment, the communication apparatus is not limited to the digital camera. For example, the communication apparatus may be an information processing apparatus such as a mobile phone, a portable media player, a tablet device, or a personal computer.

A control unit 101 controls units of the digital camera 100 according to an input signal or a program to be described below. Instead of the control unit 101 that controls the entire apparatus, a plurality of pieces of hardware may share the processing to control the entire apparatus.

An imaging unit 102 includes, for example, an optical lens unit, an optical system including a diaphragm, a zoom, a focal point, and the like, and an image sensor for converting light from an object, which is introduced through the optical lens unit, into electric signals. As the image sensor, a complementary metal oxide semiconductor (CMOS) sensor or a charge coupled device (CCD) sensor is generally used. The imaging unit 102 is controlled by the control unit 101 to convert the subject light focused by the lenses included in the imaging unit 102 into electric signals through the image sensor. The imaging unit 102 then reduces noises from the electric signal to produce digital data. The imaging unit 102 outputs the digital data as image data. In the digital camera 100 according to the present exemplary embodiment, the image data are recorded in a recording medium 110 according to the Design rule for Camera File system (DCF) specification.

A nonvolatile memory 103 is an electrically erasable and recordable nonvolatile memory, and stores programs, and the like, which will be described below, to be executed by the control unit 101.

A work memory 104 is used as, for example, a buffer memory temporarily holding the image data obtained by the imaging unit 102, an image display memory of a display unit 106, or a work area for the control unit 101.

An operation unit 105 is used to accept an instruction for the digital camera 100 from a user. The operation unit 105 includes, for example, a power supply button for a user to turn on or off the digital camera 100, a release switch for the user to capture an image, and a reproduction button for the user to instruct the reproduction of the image data. Moreover, the operation unit 105 includes an operation member such as a dedicated connection button that enables the user to start the communication with an external apparatus through a connection unit 111 to be described below. The operation unit 105 further includes a touch panel formed on the display unit 106 to be described below. The release switch includes SW1 and SW2. When the release switch is half-pressed, SW1 is turned on. This operation issues an instruction for the digital camera 100 to prepare for the process for the image capturing, such as the auto-focusing (AF) process, the auto-exposure (AE) process, the auto-white balance (AWB) process, or the electronic flash (EF) pre-emission process. When the release switch is full-pressed, SW2 is turned on. This operation issues an instruction for the digital camera 100 to capture an image.

The display unit 106 displays a view finder image during the image capturing, the captured image data, and the text for the interactive operation. The display unit 106 is not necessarily incorporated in the digital camera 100. The digital camera 100 is connectable to the display unit 106 provided inside or outside thereof, and may have at least a display control function of controlling the display on the display unit 106.

The recording medium 110 can record the image data output from the imaging unit 102. The recording medium 110 may be attachable to and detachable from the digital camera 100 or may be incorporated in the digital camera 100. In other words, the digital camera 100 has at least a unit configured to access the recording medium 110.

The connection unit 111 is an interface for connecting to the external apparatus. The digital camera 100 according to the present exemplary embodiment can exchange data with the external apparatus through the connection unit 111. For example, the image data generated by the imaging unit 102 can be transmitted to the external apparatus through the connection unit 111. In the present exemplary embodiment, the connection unit 111 includes an interface for communicating with the external apparatus through the wireless LAN according to IEEE802.11 specification. The control unit 101 implements the wireless communication with the external apparatus by controlling the connection unit 111. The communication method is not limited to the wireless LAN but may be another wireless communication method such as an infrared communication method, Bluetooth (registered trademark), or the wireless universal serial bus (USB).

A short-range wireless communication unit 112 includes, for example, an antenna used for the wireless communication, a modulation/demodulation circuit for processing wireless signals, and a communication controller. The short-range wireless communication unit 112 outputs the modulated wireless signal from the antenna and demodulates the wireless signal received by the antenna, thereby enabling the noncontact near-field communication. In the present exemplary embodiment, the noncontact near-field communication according to the ISO/IEC 18092 specification (Near Field Communication (NFC)) is achieved. The data exchanged based on the NFC are in the NFC Data Exchange Format (NDEF). The short-range wireless communication unit 112 is disposed on a side portion of the digital camera 100.

The digital camera 100 is connected to a smart device 200, which will be described below, by having their short-range wireless communication units close to each other, thus enabling the communication therebetween. When the connection is made through the short-range wireless communication units, it is not always necessary to bring the short-range wireless communication units into contact with each other. The short-range wireless communication units can communicate with each other even at a certain distance from each other. Therefore, the short-range wireless communication units may be put into the range capable of near-field wireless communication for their connection. In the description below, bringing the units close enough to be capable of the near-field wireless communication is also referred to as approximating the units.

If the short-range wireless communication units are out of the communicable range, the communication therebetween is not started. If the short-range wireless communication units are in the communicable range and the near-field wireless communication is already established between the digital camera 100 and the smart device 200, the near-field wireless communication is disconnected if the short-range wireless communication units are separated out of the communicable range. The noncontact near-field communication enabled by the short-range wireless communication unit 112 is not limited to NFC but may be any other wireless communication. For example, the short-range wireless communication unit 112 may employ the noncontact near-field communication according to ISO/IEC 14443 specification.

The connection unit 111 according to the present exemplary embodiment can communicate faster than the short-range wireless communication unit 112 to be described below. In addition, the connection unit 111 can cover a wider communication range than the short-range wireless communication unit 112. Instead, the short-range wireless communication unit 112 can limit the communication partner by taking advantage of the narrow communicable range. This eliminates the necessity of exchanging the encryption key, which is necessary in the communication of the connection unit 111. That is to say, the short-range wireless communication unit 112 enables the easier communication than the connection unit 111 does.

The connection unit 111 of the digital camera 100 according to the present exemplary embodiment has an AP mode, which enables the connection unit 111 to operate as an access point in the infrastructure mode, and a CL mode, which enables the connection unit 111 to operate as a client in the infrastructure mode. Operating the connection unit 111 in the CL mode enables the digital camera 100 according to the present exemplary embodiment to operate as the CL device in the infrastructure mode. When the digital camera 100 operates as the CL device, the digital camera 100 can participate in the network formed by the AP device if connected to the AP device. When the connection unit 111 operates in the AP mode, the digital camera 100 according to the present exemplary embodiment can operate as a simplified AP with the limited function (this AP is hereinafter referred to as simple AP). The digital camera 100 operating as the simple AP can form the network by itself. The peripheral devices near the digital camera 100 recognize the digital camera 100 as an AP device and can participate in the network formed by the digital camera 100. The programs for operating the digital camera 100 as described above are held in the nonvolatile memory 103.

The digital camera 100 according to the present exemplary embodiment is one kind of APs but is the simple AP not having a gateway function of transferring the data received from the CL device to the Internet provider. Therefore, the digital camera 100 cannot transfer the data received from other devices in the network formed by the digital camera 100 to another network such as the Internet.

Figure 1B:
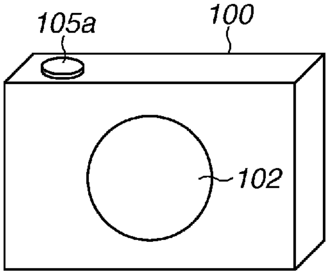
FIGS. 1B and 1C illustrate an external appearance of the digital camera according to the first exemplary embodiment.
Figure 1C:
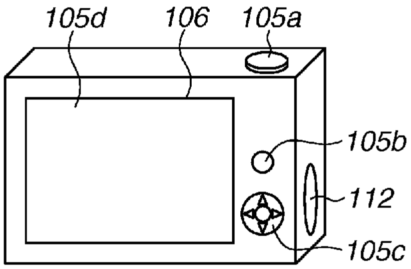

Next, the external appearance of the digital camera 100 is described. FIG. 1B and FIG. 1C illustrate an example of the external appearance of the digital camera 100. The operation unit 105 described above includes a release switch 105*a*, a reproduction button 105*b*, a direction key 105*c*, and a touch panel 105*d*. The display unit 106 displays an image captured by the imaging unit 102. The digital camera 100 according to the present exemplary embodiment includes an antenna portion of the short-range wireless communication unit 112 on a side surface of the camera casing. The near-field wireless communication can be established between the digital camera 100 and another device when the short-range wireless communication unit 112 and the communication unit of the other device are brought within a certain distance from each other. This enables the noncontact communication without the cable and the like, and can limit the communication partner as desired by the user.

This is the description on the digital camera 100.

<Internal Structure of Smart Device 200>

Figure 2:
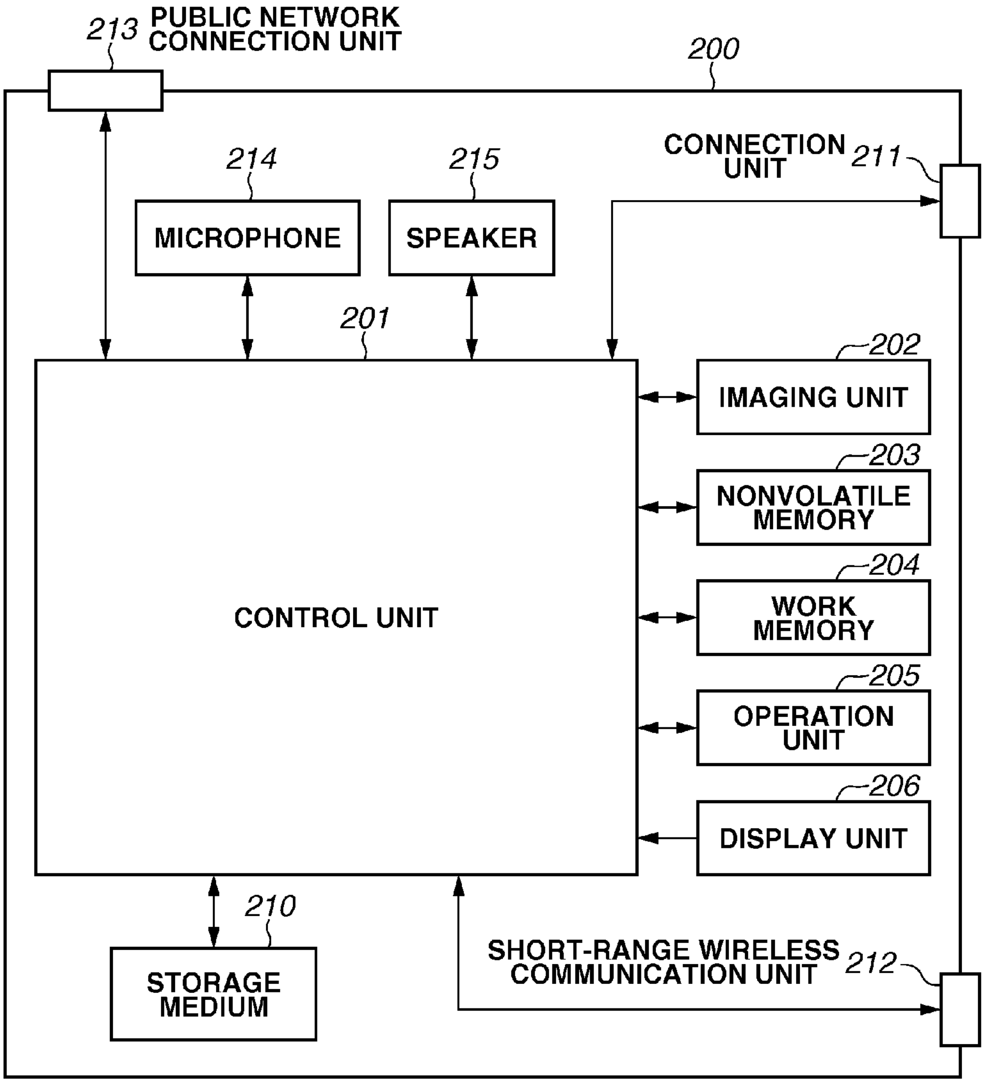
FIG. 2 is a block diagram illustrating a configuration of a smart device according to the first exemplary embodiment.

FIG. 2 is a block diagram illustrating a structure example of the smart device 200 corresponding to an example of an information processing apparatus according to the present exemplary embodiment. Smart devices include a mobile phone such as a smartphone, and a tablet device. Although the smart device is described as an example of the information processing apparatus in the present exemplary embodiment, the information processing apparatus is not limited to the smart device. The information processing apparatus may be, for example, a digital camera, a printer, a TV set, or a personal computer having a wireless function.

A control unit 201 controls units of the smart device 200 according to an input signal or a program, which will be described below. Instead of the control unit 201 that controls the entire device, a plurality of pieces of hardware may share the process to control the entire device.

An imaging unit 202 converts subject light focused by the lenses included in the imaging unit 202 into an electric signal, reduces noise from the signal to provide digital data, and outputs the digital data as image data. The captured image data is accumulated in a buffer memory. The data is calculated by the control unit 201 and then recorded in a recording medium 210.

A nonvolatile memory 203 is an electrically erasable and recordable nonvolatile memory. In the nonvolatile memory 203, an operating system (OS) as a basic software system to be executed by the control unit 201, and the applications that realize the functions in cooperation with the OS are recorded. In the present exemplary embodiment, the nonvolatile memory 203 additionally stores the application used for communicating with the digital camera 100.

The work memory 204 is used, for example, as the image display memory for the display unit 206, the work area for the control unit 201.

The operation unit 205 accepts the instruction for the smart device 200 from the user. The operation unit 205 includes a power button for a user to turn on or off the smart device 200, a touch panel formed in the display unit 206, and other operation members.

The display unit 206 displays, for example, the image data or the text for the interactive operation. The display unit 206 is not necessarily formed in the smart device 200. The smart device 200 is connectable with the display unit 206 and may have at least a display control function of controlling the display on the display unit 206.

The recording medium 210 can record the image data output from the imaging unit 202. The recording medium 210 may be attachable to and detachable from the smart device 200 or may be incorporated in the smart device 200. In other words, the smart device 200 may have at least a unit configured to access the recording medium 210.

A connection unit 211 is an interface used for connecting to an external apparatus. The smart device 200 according to the present exemplary embodiment can exchange data with the digital camera 100 through the connection unit 211. In the present exemplary embodiment, the connection unit 211 is an antenna, and the control unit 201 can connect to the digital camera 100 through the antenna. The connection to the digital camera 100 may be the direct connection or the indirection connection via the access point. The data communication may be based on protocols such as Picture Transfer Protocol over Internet Protocol (PTP/IP) through the wireless LAN, for example. The communication to the digital camera 100, however, may be achieved by another method. For example, the connection unit 211 may be an infrared ray communication module, a Bluetooth (registered trademark) communication module, a wireless USB, or any other wireless communication module.

The short-range wireless communication unit 212 enables the noncontact near-field communication with another device. The short-range wireless communication unit 212 includes an antenna for the wireless communication, a modulation/demodulation circuit for processing wireless signals, and a communication controller. The short-range wireless communication unit 212 outputs the modulated wireless signal from the antenna and demodulates the wireless signal received with the antenna, thereby performing the noncontact near-field communication. In the present exemplary embodiment, the noncontact communication based on ISO/IEC 18092 specification (NFC) is employed. Upon the reception of a data readout request from another device, the short-range wireless communication unit 212 outputs the response data based on the data stored in the nonvolatile memory 203. In the present exemplary embodiment, the smart device 200 operates in the card reader mode, the card writer mode, and the P2P mode defined in the NFC specification through the short-range wireless communication unit 212, and mainly serves as the initiator. On the other hand, the digital camera 100 mainly serves as the target through the short-range wireless communication unit 112.

A public network connection unit 213 is an interface used for the public wireless communication. The smart device 200 can make a telephone call with another device through the public network connection unit 213. At that time, the control unit 201 inputs and outputs voice signals through a microphone 214 and a speaker 215 to enable the telephone call. In the present exemplary embodiment, the public network connection unit 213 is an antenna and the control unit 201 can connect to the public network through the antenna. One antenna can be commonly used as the connection unit 211 and the public network connection unit 213.

This is the description on the smart device 200.

<Procedure of Transmitting Image Through Menu Operation>

Figure 3:
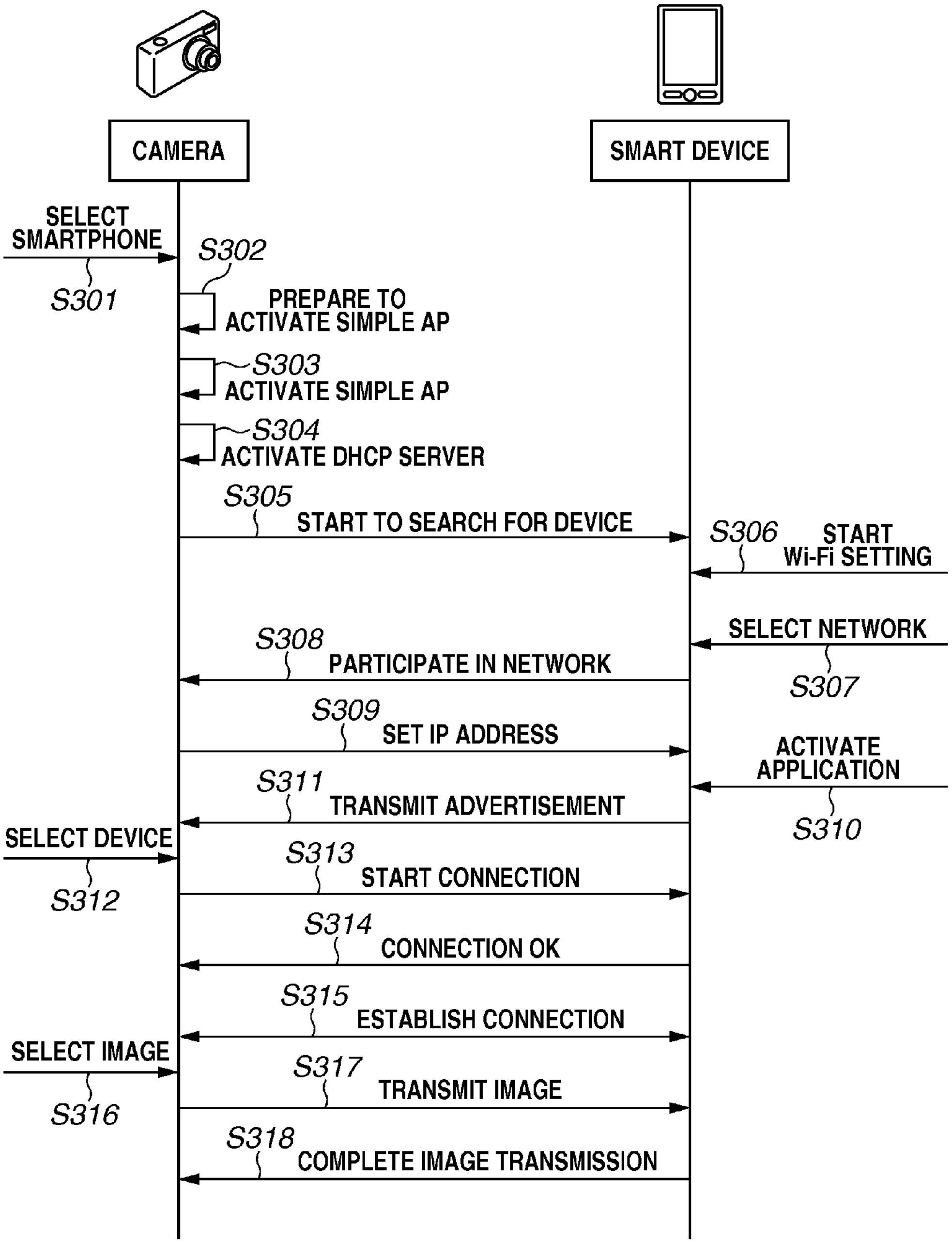
FIG. 3 is a sequence diagram illustrating a procedure of connecting the digital camera and the smart device through wireless local area network (LAN) in response to the menu operation according to the first exemplary embodiment.
Figure 4A:
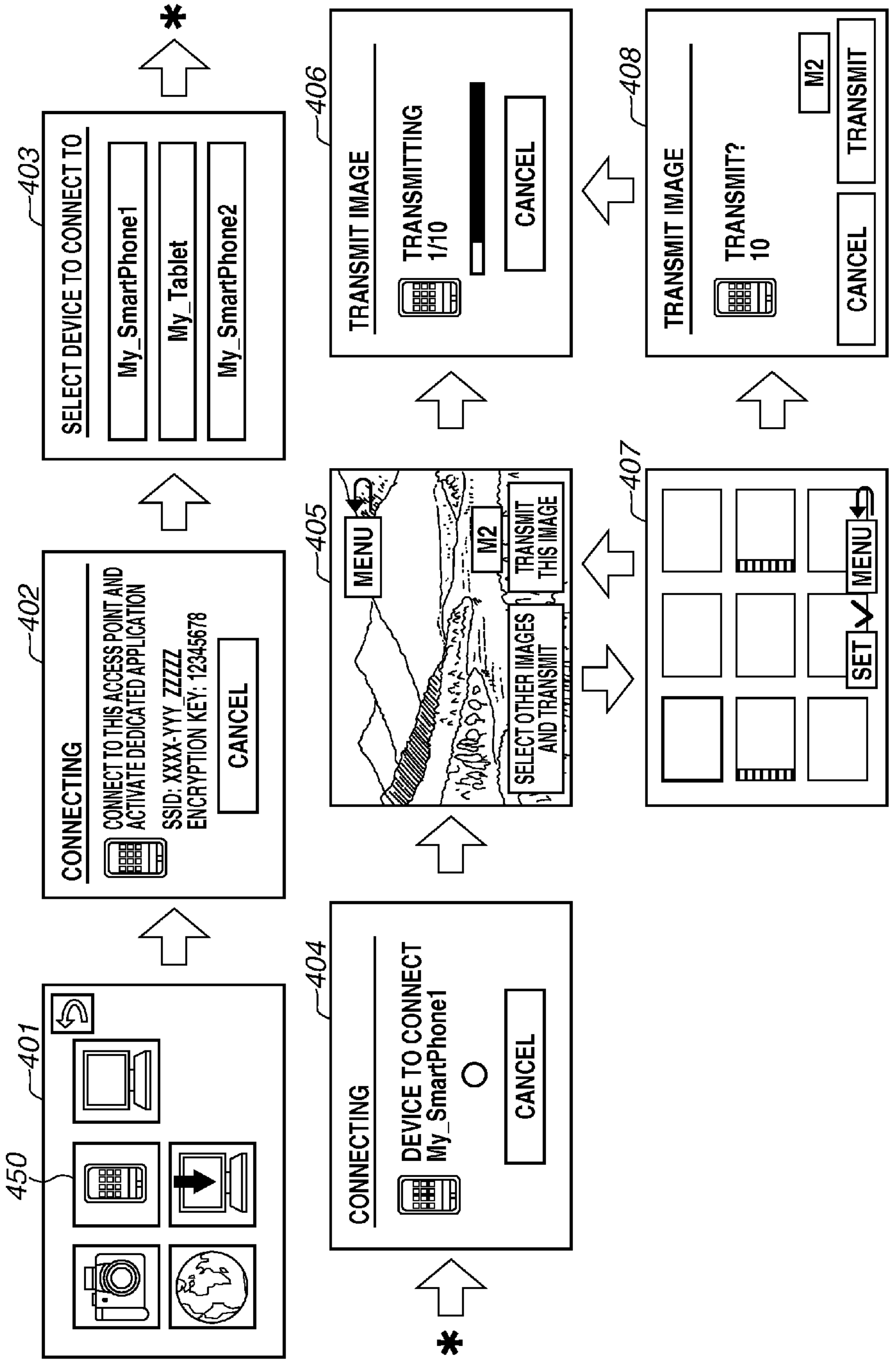
FIG. 4A is a diagram illustrating an example of information written by a control unit of the digital camera in a nonvolatile memory of a short-range wireless communication unit within the digital camera according to the first exemplary embodiment.

Next, with reference to FIG. 3 and FIG. 4A, description is made of the procedure to connect the digital camera 100 to the smart device 200 through the wireless LAN and transmit an image by a user operating the menu screen in the digital camera 100.

FIG. 3 illustrates a sequence of the process to connect the digital camera 100 in the first exemplary embodiment to the smart device 200 through the wireless LAN and transmit an image from the digital camera 100 by a user operating the menu screen displayed on the display unit 106 in the digital camera 100.

FIG. 4A illustrates how the menu screen in the display unit 106 changes along with the user operation for connecting the digital camera 100 in the first exemplary embodiment to the smart device 200 through the wireless LAN and transmitting the image from the digital camera 100 from the menu screen displayed on the display unit 106 in the digital camera 100.

In step S301, the digital camera 100 displays a screen 401 in FIG. 4A on the display unit 106, and accepts the selection of an icon (icon 450 in the screen 401) for executing the function of connecting to the smart device. The user can input the instruction to execute the connection to the smart device by selecting the icon 450 through the operation unit 105 (e.g., touch panel). The screen 401 additionally displays icons for other communication functions. Such icons include an icon to enable the connection to another camera, other than the smart device, for example, and an icon to enable the connection to a personal computer (PC) having the applicable application installed therein. Other icons for enabling the functions of uploading the content on the social networking system (SNS) and the online album website are also displayed. Upon the detection of the selection of the icon 450, the control unit 101 starts the process (process of step S302 and subsequent steps) for connecting to the wireless LAN. The wireless LAN specification may be, for example, Wi-Fi.

In step S302, the control unit 101 prepares to activate the simple AP. More specifically, after the activation of the simple AP and before the transmission of a beacon, the control unit 101 generates the communication parameters of the wireless LAN (here, at least the SSID as the network identifier and the encryption key). In the present exemplary embodiment, a value randomly determined in each execution of this step is used as the SSID and the encryption key. In other words, the generated communication parameters are different every time the wireless LAN connection is started by the user operation from the menu. The SSID is generated based on the device information recorded in the nonvolatile memory in advance. The device information includes, for example, the name of the device and the unique identification information such as the globally unique identifier (GUID) or the universally unique identifier (UUID). The encryption key is generated by repeating the encryption calculation using the generated random number as a passphrase. For example, the encryption key is generated by the method according to IEEE802.11i specification. The process of this step requires a large amount of calculations as the encryption key is generated by repeating the hash function calculation with respect to a passphrase for 4096 times. Thus, the generation of the encryption key requires a certain amount of time.

In step S303, the control unit 101 activates the simple AP using the SSID and encryption key generated in step S302, forms the wireless LAN network, and displays a screen 402. Before step S302, the list of devices that have ever been connected to the digital camera 100 (list of connection history) may be displayed to prompt a user to select whether the camera is connected to the device that has ever been connected or a new device. In this case, the communication parameters used for the connection to the device that has ever been connected in the past are held in addition to the unique identification information of that device. Upon the selection to connect to the device that has ever been connected in the past, the held communication parameters are used to generate the wireless LAN network. This enables the use of the same communication parameters in the history held in the smart device. Thus, the operation on the smart device side only requires the selection from the history and this can omit the time and effort of inputting a new pass.

In step S304, the control unit 101 activates the Dynamic Host Configuration Protocol (DHCP) server and prepares to assign the IP address to the device in the network generated by the simple AP.

In step S305, the control unit 101 starts to search for the device. A discovery protocol such as the Single Service Discovery Protocol (SSDP) or Multicast Domain Name System (DNS) is used for the device search.

In step S306, the smart device 200 accepts the instruction of starting the wireless LAN setting. The user selects the menu from the OS menu for inputting the instruction for stating the wireless LAN setting, thereby instructing the execution of the process of this step. Upon the start of the wireless LAN setting, the display unit 206 displays an SSID list display screen (not illustrated).

In step S307, the smart device 200 accepts the selection of the network of the simple AP generated by the digital camera 100 from the SSID list displayed on the display unit 206 in step S305. At that time, the display unit 106 of the digital camera 100 displays the communication parameters of the network generated by the digital camera 100 as in the screen 402. The user can select the SSID of the network generated by the digital camera 100 from the SSIDs displayed on the SSID list while viewing the SSID on the screen 402 of the digital camera 100.

In step S308, upon the user selection of the network, the smart device 200 participates in the network of the simple AP of the digital camera 100.

After the smart device 200 participates in the network, the digital camera 100 sets the IP address in the smart device

200 in step S309. The aforementioned processes establish the connection between the digital camera 100 and the smart device 200 at the network level.

Next, the connection is established at the application level through the subsequent process. In step S310, the smart device 200 accepts the user instruction for activating the application saved in the nonvolatile memory 203 of the smart device through the operation unit 205.

In step S311, the smart device 200 broadcasts the advertisement notification in the network in which the smart device 200 participated according to the control of the activated application, and notifies the digital camera 100 of its presence. The discovery protocol, for example, the SSDP, the Multicast DNS, or the like can be used for the advertisement notification.

In step S312, the control unit 101 of the digital camera 100 having received the advertisement notification in step S310 performs control to display the device name included in the advertisement on the display unit 106. At that time, the user is provided with a list of the connectable devices in the screen 403 of FIG. 4A on the display unit 106. In the network formed by the digital camera 100, a plurality of smart devices can be participated (i.e., one-to-many connections are possible in the network level). Therefore, the advertisement may be received from the plurality of devices. In such a case, the user needs to select which device to connect at the application level in this step. The user can operate the operation unit 105 to select the device to connect to on the screen 403.

In step S313, upon the detection of the selection of the smart device 200 as the device to connect to, the control unit 101 of the digital camera 100 starts the process to connect to the selected smart device 200. At this time, the control unit 101 displays a screen 404 on the display unit 106.

In step S314, the control unit 201 of the smart device 200 notifies the digital camera 100 of whether the connection is possible or not.

In step S315, the connection at the application level is established between the digital camera 100 and the smart device 200. Upon the detection of the established connection with the smart device 200, the control unit 101 displays a screen 405 or a screen 407. On these screens, the image to be transmitted is displayed and the image transmission service is started.

In step S316, the user selects the image to be transmitted. If the user wants to transmit just one image, the user selects the button to execute one image transmission of the image reproduced on the screen 405. If the user wants to transmit two or more images, the user can shift the screen to the screen 407 to select the images at one time. Upon the detection of the selection of the images and the button to execute the transmission, the control unit 101 displays the screen 408 on the display unit 106. The screen 408 allows the user to confirm the image transmission. The user selects the button to execute the image transmission again, thereby executing the image transmission.

In step S317, the control unit 101 transmits the image selected by the user operation to the smart device 200. The communication protocol used for the image transmission may be, for example, the Hyper-Text Transfer Protocol (HTTP) or the PTP/IP. During the image transmission, the control unit 101 displays a screen 406 on the display unit 106 to show the user the progress of the image transmission.

In step S318, upon the detection of the completion of image transmission, the control unit 101 displays on the display unit 106 that the image transmission has been completed, though the screen is not illustrated in the drawing. The digital camera 100 can advance the process to the selection of another image that the user wants to transmit or to the transmission. Alternatively, the digital camera 100 can get out of the image transmission mode to the imaging mode, the image reproduction mode, or shutdown.

Thus, description has been made of the procedure of the user operation on the menu screen to connect the digital camera 100 to the smart device 200 through the wireless LAN and transmit the image from the digital camera 100 according to the user operation.

<Procedure of Wireless LAN Connection Triggered by NFC>

Next described is the procedure of connecting the digital camera 100 and the smart device 200 through the wireless LAN, which is triggered by the noncontact communication between the short-range wireless communication units (hereinafter referred to as the NFC touch communication), and transmitting the image with reference to FIG. 5, FIG. 4B, FIG. 6A, and FIG. 6B.

Figure 5:
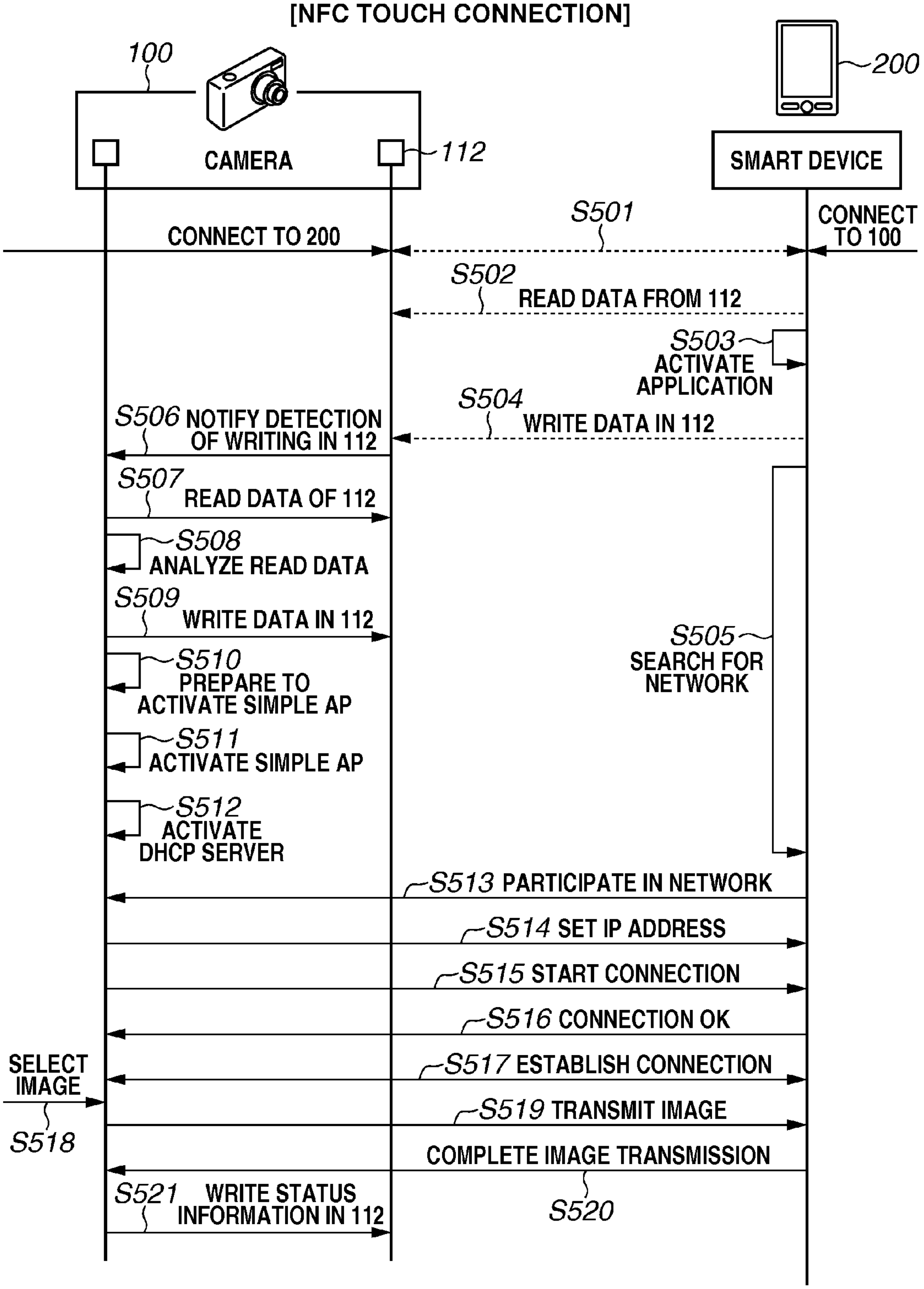
FIG. 5 is a sequence diagram illustrating a procedure of connecting the digital camera and the smart device through wireless LAN in response to Near Field Communication (NFC) according to the first exemplary embodiment.

FIG. 5 illustrates the sequence of the process for connecting the digital camera 100 according to the first exemplary embodiment to the smart device 200 through the wireless LAN with the NFC touch communication between the short-range wireless communication unit 112 of the digital camera 100 and the short-range wireless communication unit 212 of the smart device 200 as a trigger, and transmitting the image.

Figure 4B:
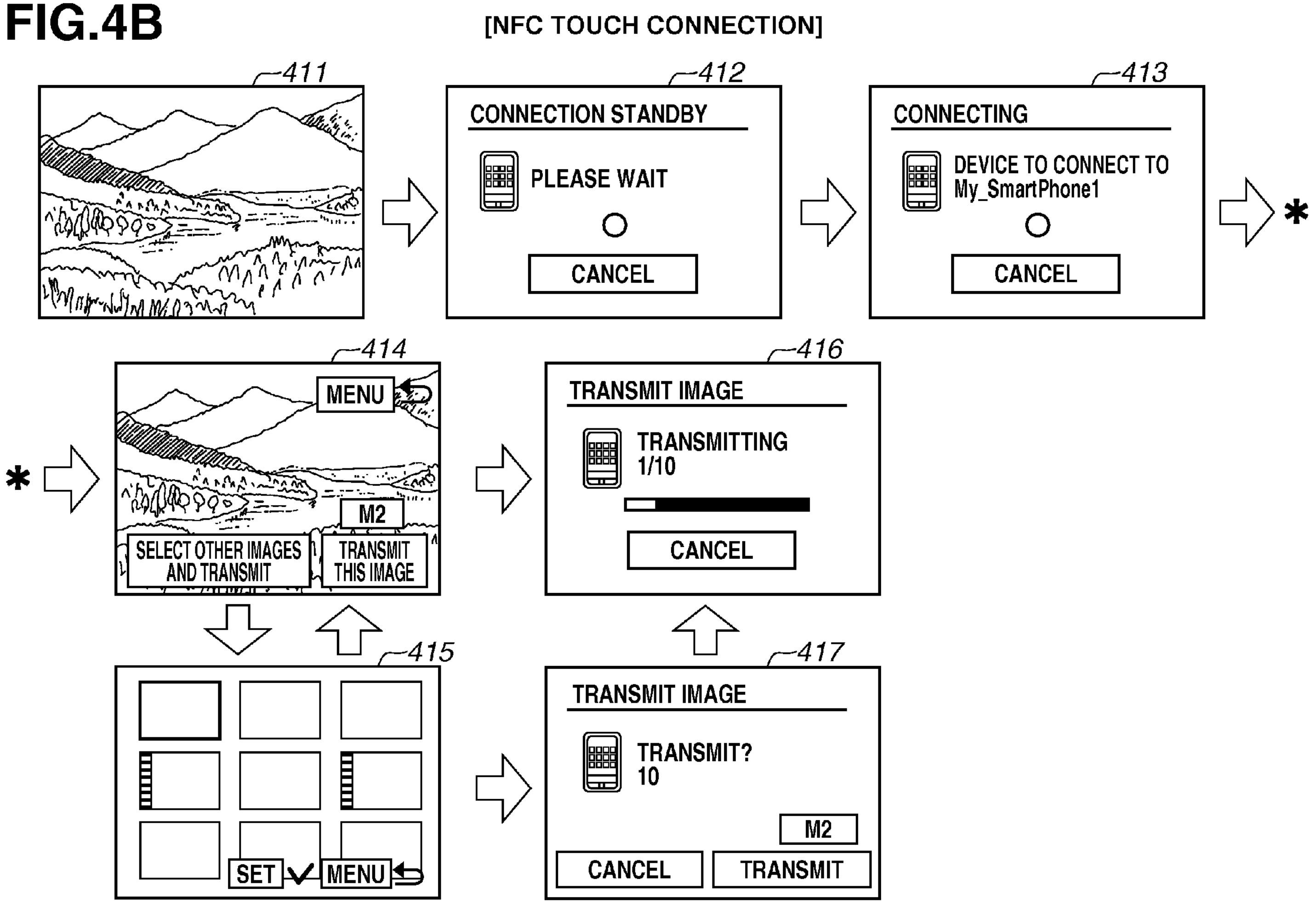
FIG. 4B illustrates an example of information written by a short-range wireless communication unit of the smart device in the nonvolatile memory of the short-range wireless communication unit within the digital camera according to the first exemplary embodiment.

FIG. 4B illustrates how the screen changes when the image is transmitted from the digital camera 100 according to the first exemplary embodiment connected to the smart device 200 through the wireless LAN, the connection being triggered by the NFC touch communication between the short-range wireless communication unit 112 of the digital camera 100 and the short-range wireless communication unit 212 of the smart device 200 in the first exemplary embodiment.

Figure 6A:
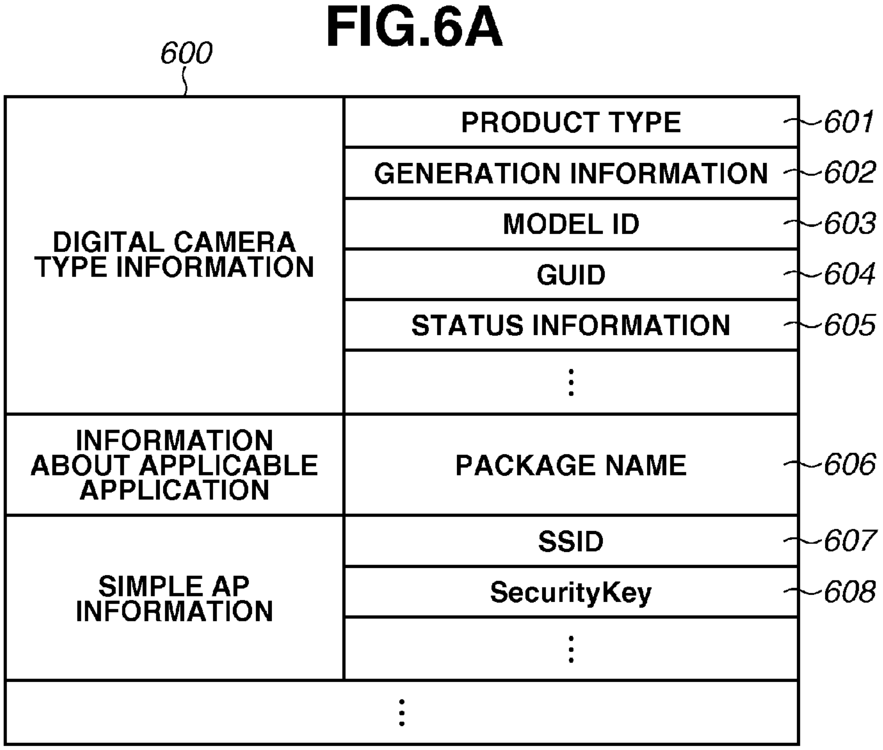
FIG. 6A is a conceptual diagram illustrating information written by the control unit of the digital camera in the nonvolatile memory of the short-range wireless communication unit of the digital camera according to the first exemplary embodiment.

FIG. 6A conceptually illustrates a configuration of information 600 written by the control unit 101 of the digital camera 100 in the nonvolatile memory of the short-range wireless communication unit 112 in the digital camera 100 according to the first exemplary embodiment.

Figure 6B:
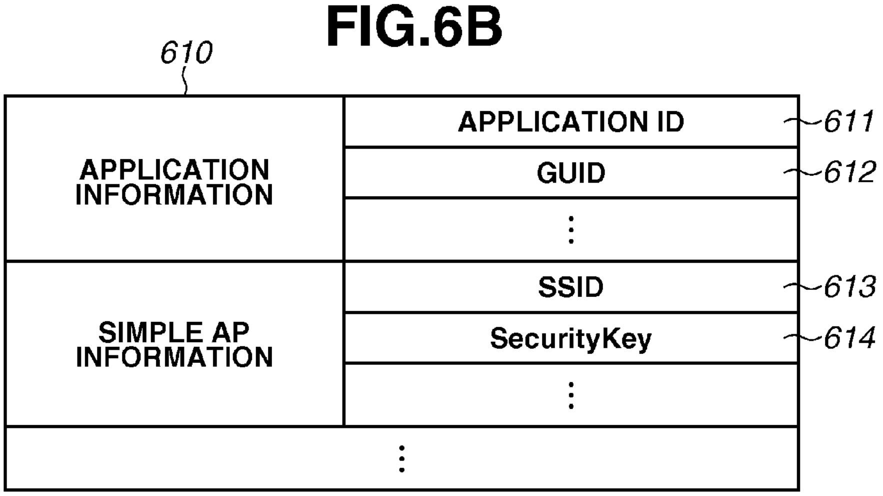
FIG. 6B is a conceptual diagram illustrating information written by the short-range wireless communication unit of the smart device in the nonvolatile memory of the short-range wireless communication unit of the digital camera according to the first exemplary embodiment.

FIG. 6B conceptually illustrates a configuration of information 610 written by the short-range wireless communication unit of the smart device 200 in the nonvolatile memory of the short-range wireless communication unit 112 in the digital camera 100 according to the first exemplary embodiment.

In step S501, first, the digital camera 100 and the smart device 200 detect each other's presence in a communicable range. Here, description is made of an example in which the user has put the digital camera 100 and the smart device 200 close to each other. In this example, the short-range wireless communication unit 112 of the digital camera 100 is an NFC tag and the short-range wireless communication unit 212 of the smart device 200 is an NFC reader/writer. The digital camera 100 reproduces the image as illustrated in a screen 411 on the display unit 106 in the image reproduction mode. In the smart device 200, the basic software is in operation.

In step S502, upon the detection of the start of the near-field wireless communication, the control unit 201 reads the information 600 saved in the nonvolatile memory of the short-range wireless communication unit 112 through the short-range wireless communication unit 212. The information 600 to be read in here includes the digital camera type information as the information about the digital camera 100, and the applicable application information that the digital camera 100 can handle. The information 600 further includes the simple AP information including the communication parameters used in the simple AP function of the digital camera 100.

The digital camera type information includes a product type 601 of the digital camera 100, generation information 602, a model ID 603, and a GUID 604 that uniquely identifies the digital camera 100. The digital camera type information further includes status information 605 representing whether the digital camera 100 is currently capable of wireless LAN communication with the smart device 200.

The applicable application information includes a package name 606 representing the applicable application that operates on the smart device 200 and cooperates with the digital camera 100 through the wireless LAN communication to acquire various pieces of image data and information within the camera.

The simple AP information includes, for example, an SSID 607 and a security key 608 serving as a passphrase for the encryption key.

These pieces of information are written in advance by the control unit 101 in the nonvolatile memory of the short-range wireless communication unit 112 before the NFC touch communication with the smart device 200 (e.g., at a timing of turning off the power of the digital camera 100). Different from the wireless LAN connection from the menu operation, the SSID saved in the nonvolatile memory of the short-range wireless communication unit 112 employs a fixed value unique to each digital camera. For example, the SSID calculated from the media access control (MAC) address assigned to the connection unit 111 is used. This is because of the reason below. The procedure of connecting to the wireless LAN through the NFC is easier than the procedure of connecting to the wireless LAN from the menu operation because the former procedure does not require the password. In addition, when the wireless LAN is connected to a temporary communication partner, the NFC is used more often than the menu operation. If the wireless LAN connection through the NFC as above employs the SSID that is different in each connection, many SSIDs that may not be used are left in the history on the smart device side. In order to prevent this, the SSID to be saved in the nonvolatile memory of the short-range wireless communication unit 112 uses the fixed value. On the other hand, the security key needs to have a high level of security, so that the value is generated randomly each time and saved as the security key in the nonvolatile memory of the short-range wireless communication unit 112. The number of letters of the security key may be smaller than that in the case of the wireless LAN connection by the menu operation. In this case, the lack of letters can be compensated on the smart device side. More specifically, in this case, how to compensate the letters is determined in advance and the corresponding value may be generated on the digital camera 100 side and used to form the network. For example, a zero or zeros may be added to the reduced character string at the head or in the end thereof to compensate the letters.

In step S503, the control unit 201 analyzes the read package name 606 and activates the applicable application corresponding to the package name. Next, the control unit 201 analyzes the information 600 according to the instruction of the application, and determines whether the digital camera can transfer the image through the wireless LAN connection to the smart device 200 based on the product type 601, the generation information 602, the model ID 603, and the like. Based on the status information 605, the smart device 200 determines whether the digital camera 100 is currently capable of wireless LAN communication with the smart device 200. For example, if the user has disabled the wireless LAN in the menu of the digital camera 100, this status information 605 is recorded with the values representing that the wireless LAN communication is currently impossible.

In step S504, the control unit 201 writes the information 610 about the smart device 200 in the short-range wireless communication unit 112 of the digital camera 100 through the short-range wireless communication unit 212. This notifies the digital camera 100 of the completion of the reading of the information in step S502 and further notifies the digital camera 100 that the smart device 200 has a function of handover of the wireless LAN.

The information 610 written here includes the application information, such as an application ID 611 and an application GUID 612, and the simple AP information, such as an SSID 613 and a security key 614 as illustrated in FIG. 6B. The simple AP information written here is identical to the information of the simple AP included in the information 600 read from the short-range wireless communication unit 112 of the digital camera 100 in step S502. This writing is conducted to overwrite the information about the digital camera 100 in FIG. 6A from the head of the nonvolatile memory of the short-range wireless communication unit 112.

The information read in step S502 is overwritten because of the reason below. The NDEF data can be easily written into the recording area of the short-range wireless communication unit 112 (here, NFC tag) by use of the API provided by the OS, for example. For example, the writing into the recording area of the NFC tag requires specifying the data size and the region to write in, and updating the attribute information after the writing. However, if the API is used, the application only needs to specify the data to write. In other words, a developer just focuses on the handling of the payload part of the data. However, in some cases, the API has a priority on the simple implementation, and therefore, the input of detailed instructions may be impossible. For example, it may be difficult to rewrite some items while maintaining other items. If the application instructs the OS to write the information 610 about the smart device 200 simply and does not instruct to write data about the other area, the information recording nothing in that area is written in the header of the NDEF. In other words, this can be said that the data in the other area are deleted. This results in an issue as below. For generating the network, the digital camera 100 uses the communication parameters recorded in the recording area of the NFC tag. Thus, the communication parameters are shared with the smart device 200. If the communication parameters are deleted because the smart device 200 has written that the information of the NFC tag is already read, the digital camera 100 cannot acquire the communication parameters used for generating the network from the recording area of the NFC tag. Therefore, the smart device 200 writes the information that the information of the NFC tag has been read, and additionally writes back the information of the NFC tag, which has been just read out. At least the items for which the communication parameters are recorded are set back to the state before the NFC tag is read, so that the digital camera 100 can acquire the communication parameters to be used in the generation of the network.

In step S505, the control unit 201 waits while repeating to search for the wireless LAN network until the digital camera 100 generates the wireless LAN network of the simple AP.

In step S506, the digital camera 100 displays a screen 412 on the display unit 106 when the control unit 101 detects that the information 610 is written by the smart device 200 in the nonvolatile memory of the short-range wireless communication unit 112.

In step S507, the information 610 saved in the nonvolatile memory of the short-range wireless communication unit 112 is read to store in the work memory 104.

In step S508, the control unit 101 analyzes the information 610 and determines whether the writing is from the smart device that can exchange images with the digital camera 100 through the wireless LAN connection based on the application ID 611, etc.

In step S509, the control unit 101 returns the information, which is stored in the nonvolatile memory of the short-range wireless communication unit 112 written by the smart device 200 in step S504, to the configuration of the information 600 representing the digital camera 100 again. More specifically, the information 600 about the digital camera 100 is written in the nonvolatile memory of the short-range wireless communication unit 112. At that time, the security key different from the security key read in step S502 for the next NFC touch connection is written as the security key 608. For example, the security key may correspond to random numbers generated by the control unit 101 before the information 600 is written in the nonvolatile memory of the short-range wireless communication unit 112. Thus, as the communication parameters of the NFC tag, the parameters other than the parameters used in the wireless LAN connection with the smart device 200 to which the connection is going to be made are recorded. This can prevent the parameters, which are to be used in the wireless LAN connection with the smart device 200 to which the connection is going to be made, from being read just by the approximation. In other words, the security is enhanced. In regard to the SSID, the SSID identical to the SSID read in step S502 is written. Once the digital camera 100 is connected to the smart device 200 through the wireless LAN, the digital camera 100 does not connect to other devices through the wireless LAN. In this case, the information representing that the wireless LAN communication is currently impossible is written in advance in the status information 605 to prevent another applicable smart device attempts the wireless LAN connection.

In step S510, the control unit 101 prepares to activate the simple AP. Before activating the simple AP, the SSID and the encryption key are generated. The SSID is generated based on the SSID 613 held in the work memory 104 in step S507. The encryption key is generated similarly based on the security key 614 held in the work memory 104 in step S507. At this time, the amount of calculation is reduced in comparison to step S302 in FIG. 3 to generate the encryption key, so that the generation time is shortened. For example, the number of times of repeating the hash function calculation is set to 10 times, not 4096 times.

In step S511, the control unit 101 activates the simple AP to generate the wireless LAN network and waits for the smart device 200 to participate in this network.

In step S512, the control unit 101 activates the DHCP server. In step S512, the process similar to the process in step S303 is executed.

In step S513, the control unit 201 participates in the wireless LAN network of the simple AP generated by the digital camera 100 in step S511 based on the SSID 607 and the security key 608 read in step S502.

In step S514, the control unit 101 sets the IP address to the smart device 200. The process in step S514 is similar to that in step S308.

In step S515, the control unit 101 starts the process to connect to the smart device 200 and displays a screen 413 on the display unit 106.

In step S516, the control unit 201 notifies the digital camera 100 whether the connection is possible or not.

In step S517, the connection is established between the digital camera 100 and the smart device 200. Upon the detection of the establishment of the connection with the smart device 200, the control unit 101 displays a screen 414 or 416 to display the image to be transmitted on the display unit 106.

In step S518, the digital camera 100 accepts the selection of the image to be transmitted. For transmitting just one image, the user selects the button to execute one image transmission reproduced on the screen 414. For transmitting two or more images, the user can shift the screen to the screen 416 to select the images at one time. When the control unit 101 has detected that the two or more images are selected and the button to execute the transmission is selected, the control unit 101 displays a screen 417 on the display unit 106 for allowing the user to confirm the image transmission. The user selects the button for the image transmission again to execute the image transmission.

In step S519, the control unit 101 transmits the image selected by the user operation to the smart device 200. The communication protocol executing the image transmission may be, for example, HTTP or PTP/IP. During the image transmission, the control unit 101 displays a screen 415 on the display unit 106 to show the user the progress of the image transmission.

In step S520, upon the detection of the completion of the image transmission, the control unit 101 displays the completion of the image transmission on the display unit 106, which is not illustrated. After that, the digital camera 100 can advance the process to the selection of another image that the user wants to transmit or to the transmission. Alternatively, the digital camera 100 can get out of the image transmission mode to the imaging mode, the image reproduction mode, or shutdown. Upon the disconnection of the wireless LAN between the digital camera 100 and the smart device 200 by the user instruction, the process advances to step S521. Here is described an example of disconnecting the wireless LAN upon the user instruction for simplifying the description. However, the wireless LAN may be disconnected by any other trigger. For example, the wireless LAN may be disconnected in response to the completion of the image transmission.

In step S521, upon the disconnection of the wireless LAN, the control unit 101 writes the information notifying that the wireless LAN communication is possible in the status information 605 of the information 600 saved in the nonvolatile memory of the short-range wireless communication unit 112.

The description has been made of the procedure of transmitting the image by connecting the digital camera 100 and the smart device 200 through the wireless LAN with the noncontact communication between the short-range wireless communication units used as a trigger. After the completion of step S504, the user does not need to keep the camera and the device close to each other. Once the wireless LAN connection is established, the wireless LAN connection is not affected by the disconnection of the NFC communication. In other words, the wireless LAN connection is maintained.

<Operation of Digital Camera 100>

Next, the operation of the digital camera 100 to implement the above procedure is described.

Figure 7:
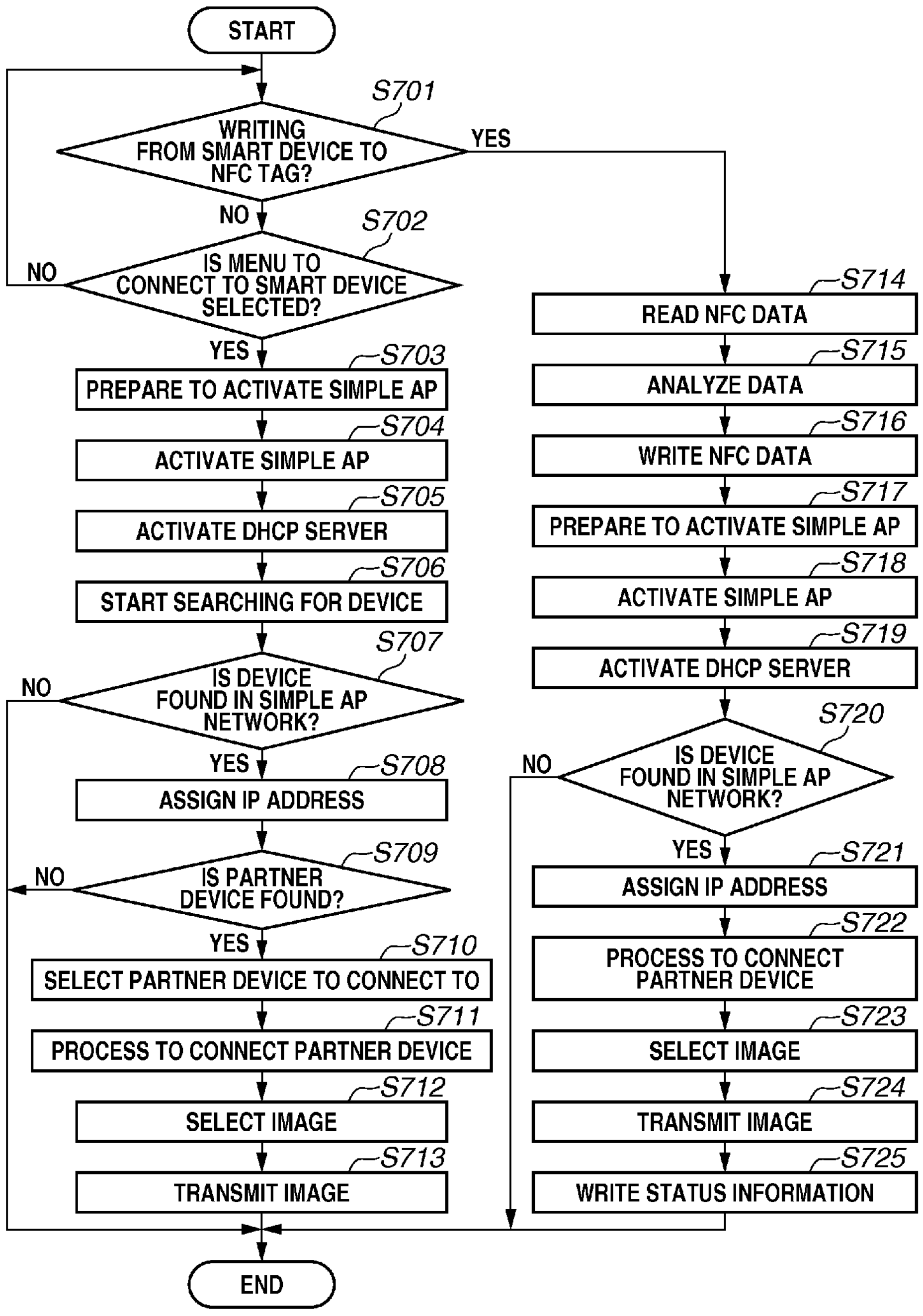
FIG. 7 is a flowchart illustrating processing of a digital camera according to the first exemplary embodiment.

FIG. 7 is a flowchart illustrating the operation of the digital camera 100 according to the present exemplary embodiment.

In step S701, the control unit 101 detects whether the writing has been conducted in the nonvolatile memory of the short-range wireless communication unit 112. The process in step S701 corresponds to that in step S506 in FIG. 5. If the writing in the nonvolatile memory of the short-range wireless communication unit 112 is detected (YES in step S701), the process advances to step S714. If not (NO in step S701), the process advances to step S702.

First, the case of advancing to step S702 is described.

In step S702, the control unit 101 detects whether the user has selected the menu to connect the digital camera 100 to the smart device 200 for image transmission. If the menu has been selected (YES in step S702), the process advances to step S703. If not (NO in step S702), the process returns to step S701. The process in step S702 corresponds to the process in step S301 in FIG. 3.

In step S703, the control unit 101 prepares to activate the simple AP. In other words, the wireless LAN communication parameters with random values (at least the SSID and encryption key) are generated. The process in step S703 corresponds to the process in step S302 in FIG. 3.

In step S704, the control unit 101 activates the simple AP function and starts the broadcast of the beacon including the communication parameters generated in step S703. The process in step S704 corresponds to the process in step S303 in FIG. 3.

In step S705, the control unit 101 activates the DHCP server. The process in step S705 corresponds to the process in step S304 in FIG. 3.

In step S706, the control unit 101 starts to search for the device. The process in step S706 corresponds to the process in step S305 in FIG. 3.

In step S707, the control unit 101 detects whether the device is found in the simple AP network. If the device is found in the network (YES in step S707), the process advances to step S708. If not (NO in step S707), the process is ended. For example, if the device is not found in the network for a certain period of time, the display unit 106 displays this fact, which is not illustrated, and the operation of the simple AP is ended.

In step S708, the control unit 101 assigns the IP address to the device participated in the network. The process in step S708 corresponds to the process in step S309.

In step S709, the control unit 101 detects whether the connectable partner has been found or not. In step S709, if the transmission of the advertisement from the smart device 200 has been detected (YES in step S709), the process advances to step S710. If not (NO in step S709), the process is ended. For example, if the advertisement transmission is not received for a certain period of time, the display unit 106 displays the non-reception, which is not illustrated, and the operation of the simple AP is ended.

In step S710, the control unit 101 detects whether the user has selected the partner device to connect. The process in step S710 corresponds to the process in step S312 in FIG. 3.

In step S711, the control unit 101 starts the process to connect to the smart device 200 as the partner device selected by the user. The process in step S711 corresponds to the process in steps S313 and S315 in FIG. 3.

In step S712, the control unit 101 detects whether the image to be transmitted has been selected by the user operation. The process in step S712 corresponds to the process in step S316 in FIG. 3.

In step S713, the control unit 101 transmits the selected image to the smart device 200. The process in step S713 corresponds to the process in step S317 in FIG. 3. Upon the completion of the image transmission, the image transmission process is ended.

The description has been made of the example in which the process advances from step S701 to step S702.

Description will next be made of the example in which the process advances from step S701 to step S714.

In step S714, the control unit 101 reads out the information written in the nonvolatile memory of the short-range wireless communication unit 112 in step S701. The process in this step S714 corresponds to the process in step S507 in FIG. 5.

In step S715, the control unit 101 analyzes the readout information. The process in step S715 corresponds to the process in step S508 in FIG. 5. If it is detected that the writing is not from the smart device capable of the image transfer with the digital camera 100 through the wireless LAN connection as a result of the analysis of the information, the process of this flowchart ends. For example, with reference to the identifier identifying the application included in the information written by the smart device 200, whether the application is applicable or not is checked. In addition, whether the SSID and security key have been written properly is checked. If the application is not applicable or the information of the SSID or the security key is insufficient, it is determined that the writing is not from the smart device and thus the process of this flowchart is ended.

In step S716, the control unit 101 writes the information including the communication parameters for the next or subsequent handovers in the nonvolatile memory of the short-range wireless communication unit 112. Among the communication parameters for the handover written here, the same value is written as the SSID each time, which is different from step S703. Thus, the unnecessary information is not left in the connection history of the smart device 200. For the security key, the random number is used. The process in step S716 corresponds to the process in step S509 in FIG. 5.

In step S717, the control unit 101 prepares to activate the simple AP. Here, the SSID and the encryption key are generated from the communication parameters read out in step S714 instead of the communication parameters written in the nonvolatile memory of the short-range wireless communication unit 112 in step S716. The amount of calculation for generating the encryption key is smaller than that for generating the encryption key in step S703. This can reduce the time to the wireless LAN connection. The process in step S717 corresponds to the process in step S510 in FIG. 5.

In step S718, the control unit 101 activates the simple AP. The process in step S718 corresponds to the process in step S511 in FIG. 5.

In step S719, the control unit 101 activates the DHCP server. The process in step S719 corresponds to the process in step S512 in FIG. 5.

In step S720, the control unit 101 detects whether the device is found in the simple AP network. If it is determined that the device is found in the network (YES in step S720), the process advances to step S721. If not (NO in step S720), the process is ended. For example, if the device is not found in the network for a certain period of time, the display unit 106 displays this fact, which is not illustrated, and the operation of the simple AP is ended.

In step S721, the control unit 101 assigns the IP address to the connection device. The process in step S721 corresponds to the process in step S514 in FIG. 5.

In step S722, the control unit 101 starts the process to connect to the smart device 200. The process in step S722 corresponds to the process in steps S515 and S517 in FIG. 5.

In step S723, the control unit 101 detects whether the image to be transmitted has been selected by the user operation. The process in step S723 corresponds to the process in step S518 in FIG. 5.

In step S724, the control unit 101 transmits the selected image to the smart device 200. The process in step S724 corresponds to the process in step S519 in FIG. 5. Upon the completion of the image transmission, the image transmission process is ended. Along with this, the wireless LAN connection with the smart device 200 is terminated.

In step S725, the control unit 101 writes the status information of the digital camera 100 in the nonvolatile memory of the short-range wireless communication unit 112. More specifically, the information representing that another wireless LAN connection is currently possible is written. After that, for example, the digital camera 100 may be automatically turned off.

The description has been made of the flowchart of the process of the digital camera 100 according to the present exemplary embodiment.

<Process Flow of Smart Device 200>

Next described is the operation of the smart device 200 to implement the above procedure.

Figure 8:
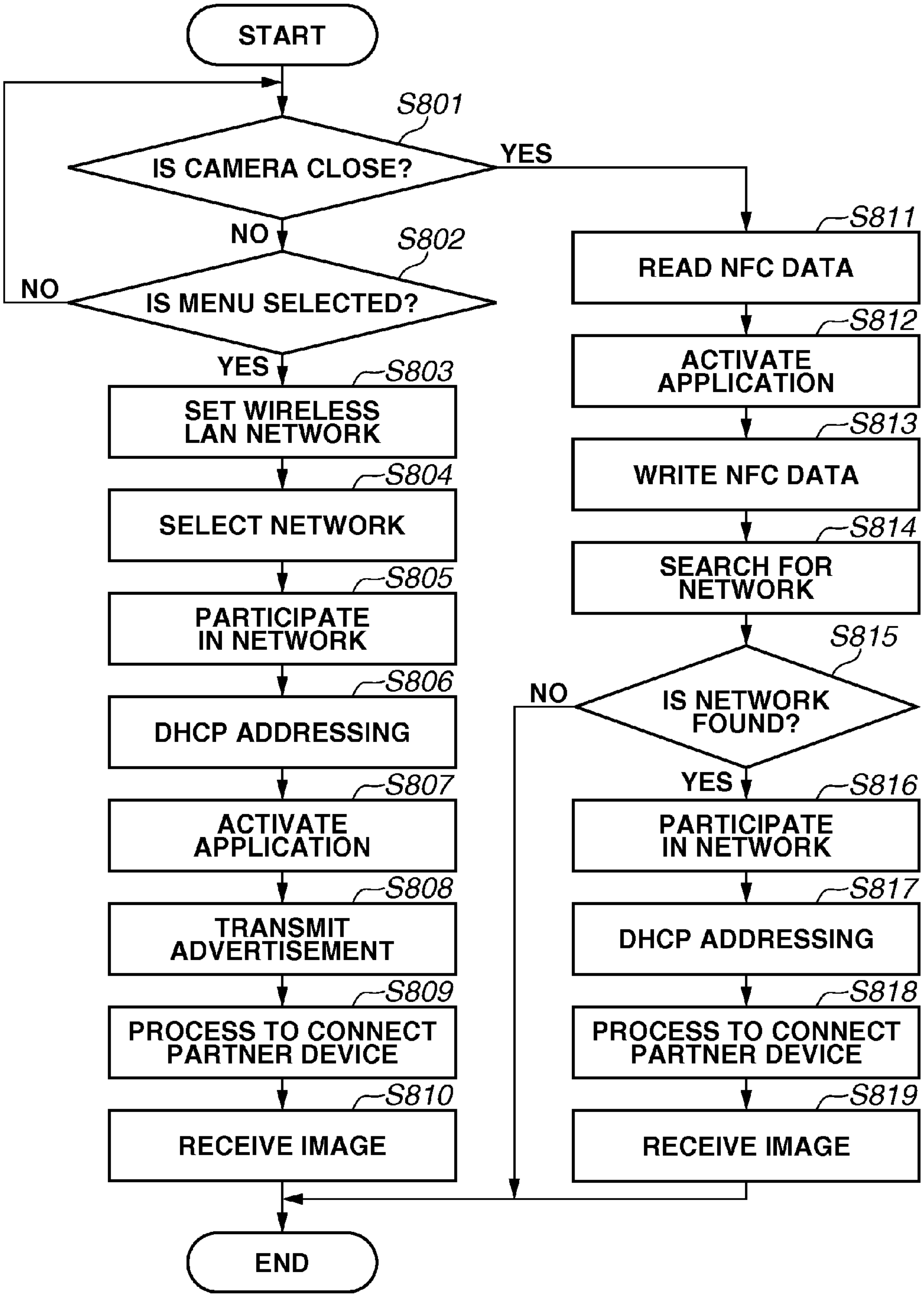
FIG. 8 is a flowchart illustrating processing of a smart device according to the first exemplary embodiment.

FIG. 8 is a flowchart illustrating an operation of the smart device 200 according to the present exemplary embodiment.

In step S801, the control unit 201 detects whether the short-range wireless communication unit 212 is close to the short-range wireless communication unit 112 of the digital camera 100. The process in step S801 corresponds to the process in step S501 in FIG. 5. If it is determined that the short-range wireless communication unit 212 is close to the short-range wireless communication unit 112 (YES in step S801), the process advances to step S810. If not (NO in step S801), the process advances to step S802.

First, the example in which the process has advanced to step S802 is described.

In step S802, the control unit 201 detects whether the user has selected the menu to connect to the digital camera 100 for image reception. If it is determined that the menu is selected (YES in step S802), the process advances to step S803. If not (NO in step S802), the process returns to step S801.

In step S803, the control unit 201 detects whether the user has selected the setting menu for the wireless LAN network through the operation unit 205. The process in step S803 corresponds to the process in step S306 in FIG. 3.

In step S804, the control unit 201 detects whether the user has selected the network to connect to through the operation unit 205. The process in step S804 corresponds to the process in step S307 in FIG. 3.

In step S805, the control unit 201 participates in the network selected in step S804. The process in step S805 corresponds to the process in step S308 in FIG. 3.

In step S806, the control unit 201 sets the IP address rented from the digital camera 100 in step S309 in FIG. 3 by the DHCP addressing as the IP address of the smart device 200.

Next, in step S807, the control unit 201 activates the application for connecting to the digital camera 100 and receiving the image from the digital camera 100. The process in step S807 corresponds to the process in step S310 in FIG. 3.

In step S808, the control unit 201 transmits the advertisement to the digital camera 100. The process in step S808 corresponds to the process in step S311 in FIG. 3.

In step S809, the control unit 201 performs the process to connect to the digital camera 100. The process in step S809 corresponds to the process in step S314 in FIG. 3.

In step S810, the control unit 201 receives the images transmitted from the digital camera 100. Upon the completion of the reception of all the images, the digital camera 100 is notified of the completion of the image transmission. Then, the display unit 206 displays the message to notify the completion of the reception, and the process is terminated.

The description has been made of the example in which the process advances from step S801 to step S802.

Description will next be made of the example in which the process advances from step S801 to step S811.

In step S811, the control unit 201 reads the information recorded in the nonvolatile memory of the short-range wireless communication unit 112 of the digital camera 100 by the short-range wireless communication unit 212. The process in step S811 corresponds to the process in step S502 in FIG. 5. If the information read out here is inapplicable information, the error is output and the process of this flowchart is ended. The inapplicable information may be, for example, the readout data which is not compliant to the NDEF. The error is also output when the devices are brought close to each other but not for long enough and are separated before the information is read. In such a case, the process is terminated. In addition, the process of this flowchart is terminated when the smart device 200 is already connected to another device through the wireless LAN.

In step S812, the control unit 201 activates the application for connecting to the digital camera 100 and receiving the image therefrom based on the information read out in step S811. The process in step S812 corresponds to the process in step S503 in FIG. 5.

In step S813, the control unit 201 writes the information in the nonvolatile memory of the short-range wireless communication unit 112 of the digital camera 100 by the short-range wireless communication unit 212. The information written here includes, in addition to the information of the smart device 200, the SSID and the security key read out in step S811. The process in step S813 corresponds to the process in step S504 in FIG. 5. If the wireless LAN communication with another digital camera has already been established, step S813 is omitted and the user is notified that the communication with the other device is already made. Then, the process of this flowchart is terminated.

In step S814, the control unit 201 searches for the wireless LAN network. More specifically, the SSID and the security key read out in step S811 are recorded in the database of the SSIDs managed by the OS as the effective information. Moreover, the other SSIDs managed already are disabled. In this case, even though the smart device 200 has already participated in another wireless LAN network, the smart device 200 gets out of that wireless LAN network and searches for the network of the digital camera 100 only. The process in step S814 corresponds to the process in step S505 in FIG. 5.

In step S815, the control unit 201 detects whether the network has been found or not. If the wireless LAN network has been detected (YES in step S815), the process advances to step S816. If not (NO in step S815), the process is ended. For example, if the wireless LAN network is not found for a certain period of time, the display unit 106 displays this fact, which is not illustrated, and the search for the wireless LAN network is ended.

In step S816, the control unit 201 participates in the wireless LAN network. The process in step S816 corresponds to the process in step S513 in FIG. 5.

In step S817, the control unit 201 sets the IP address rented from by the digital camera 100 in step S514 in FIG. 5 by the DHCP addressing as the IP address of the smart device 200.

In step S818, the control unit 201 performs the process to connect to the digital camera 100. The process in step S818 corresponds to the process in step S516 in FIG. 5.

In step S819, the control unit 201 receives the image from the digital camera 100. Upon the completion of the reception of all the images, the digital camera 100 is notified of the completion of the image transmission. Then, the display unit 206 displays, for example, the message, which is not illustrated, to notify that the reception is completed, and the process is terminated. The received image is saved in the same recording medium as the recording medium storing the images captured by the imaging unit 202 of the smart device 200.

The description has been made of the process of the smart device 200 according to the present exemplary embodiment.

The digital camera 100 according to the present exemplary embodiment uses the appropriate SSID with different communication parameters in the wireless LAN connection triggered by the menu operation and in the wireless LAN connection triggered by the noncontact wireless communication. More specifically, if the wireless LAN connection is triggered by the menu operation, the priority is put on the security, and the SSID formed randomly each time is used. If the wireless LAN connection is triggered by the noncontact wireless communication, the priority is put on the convenience of the smart device, and the same SSID is used each time. In this manner, by using the SSID appropriate for the purpose according to the connection procedure, the communication partner is less likely to hold the unnecessary connection history.

In the present exemplary embodiment, the SSID used in the wireless LAN connection triggered by the menu operation is formed randomly, while the SSID used in the wireless LAN connection triggered by the noncontact wireless communication is fixed. The SSID used in the wireless LAN connection triggered by the menu operation may contain the character string partly common to the SSID used in the wireless LAN connection triggered by the noncontact wireless communication. For example, the letters in the first half are common and the letters in the latter half are randomly set if the wireless LAN connection is triggered by the menu operation, and are fixed if the wireless LAN connection is triggered by the noncontact wireless communication. In this case, the user can know that the network is formed by the same digital camera 100 by referring to either the SSID used in the wireless LAN connection triggered by the noncontact wireless communication or the SSID used in the wireless LAN connection triggered by the noncontact wireless communication. The common character string may contain a value based on the GUID of the digital camera 100 or a value calculated from the MAC address assigned to the connection unit 111. In other words, any value unique to each device may be employed.

The programs that achieve one or more functions according to the present exemplary embodiment can be supplied to a system or a device through a network or a storage medium and read out and executed by one or more processors in the system or the device. A circuit achieving the one or more functions (such as ASIC) can execute the programs.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-207451, filed Oct. 8, 2014, which is hereby incorporated by reference herein in its entirety.

What is claimed is:

1. A communication apparatus comprising:

a first communication interface configured to communicate with an external apparatus through a network using a first wireless communication;

a second communication interface configured to communicate with the external apparatus using a second wireless communication, which is different from the first wireless communication;

a user interface configured to accept an instruction for communicating with the external apparatus using the first communication interface; and a controller configured to control the communication with the external apparatus by using the first communication interface, wherein in a case where the communication with the external apparatus is performed using the first wireless communication in response to acceptance of the instruction with a predetermined operation, the controller controls the first communication interface to communicate with the external apparatus with an identifier that is different for each connection, wherein in a case where the communication with the external apparatus is performed using the first wireless communication in response to the communication with the external apparatus by the second communication interface, the controller controls the first communication interface to communicate with the external apparatus with a predetermined identifier for each connection, wherein the identifier that is different for each connection includes a common character string, and wherein the identifier to be used in the case where the communication with the external apparatus is performed using the first wireless communication in response to acceptance of the instruction with the predetermined operation, and the identifier used in the case where the communication with the external apparatus is performed using the first wireless communication in response to the communication with the external apparatus by the second communication interface include the common character string.

2. The communication apparatus according to claim 1, wherein in the case where the communication with the external apparatus is performed using the first wireless communication in response to acceptance of the instruction with the predetermined operation, the controller generates the identifier that is different for each connection, and wherein in the case where the communication with the external apparatus is performed using the first wireless communication in response to the communication with the external apparatus by the second communication interface, the controller reads the predetermined identifier from a recording area for each connection.

3. The communication apparatus according to claim 1, wherein in the case where the communication with the external apparatus is performed using the first wireless communication in response to acceptance of the instruction with the predetermined operation, the controller controls the first communication interface to generate the network using the identifier that is different for each connection, and wherein in the case where the communication with the external apparatus is performed using the first wireless communication in response to the communication with the external apparatus by the second communication interface, the controller controls the first communication interface to generate the network using the predetermined identifier for each connection.

4. The communication apparatus according to claim 1, wherein in the case where the communication with the external apparatus is performed using the first wireless communication in response to acceptance of the instruction with the predetermined operation, the controller controls the first communication interface to generate the network using the identifier that is different for each connection and using a password that is different for each connection, and wherein in the case where the communication with the external apparatus is performed using the first wireless communication in response to the communication with the external apparatus by the second communication interface, the controller controls the first communication interface to generate the network using the predetermined identifier for each connection and using a password that is different for each connection.

5. The communication apparatus according to claim 1, wherein the common character string is determined based on a media access control (MAC) address or a universally unique identifier (UUID) of the communication apparatus.

6. The communication apparatus according to claim 1, wherein a character string included in the identifier is determined based on a media access control (MAC) address or a universally unique identifier (UUID) of the communication apparatus.

7. The communication apparatus according to claim 1, wherein the identifier includes an identifier for identifying the network through the first wireless communication.

8. The communication apparatus according to claim 1, further comprising a recording unit configured to record a connection history of the first wireless communication in a recording medium, wherein in a case where the user interface accepts an instruction for communicating with the external apparatus using the first wireless communication with use of the connection history by an operation, which is different from the predetermined operation, the controller performs control to communicate with the external apparatus with the network identifier held in the connection history.

9. The communication apparatus according to claim 1, further comprising an imaging unit, wherein the first communication interface transmits image data generated by the imaging unit to the external apparatus and the second communication interface does not transmit the image data generated by the imaging unit to the external apparatus.

10. The communication apparatus according to claim 9, wherein the first wireless communication is disconnected when the transmission of the image data is completed.

11. The communication apparatus according to claim 1, wherein the first wireless communication covers a wider communication range than the second wireless communication.

12. The communication apparatus according to claim 1, wherein the first wireless communication is performed via a wireless local area network (LAN) and the second wireless communication is performed via Near Field Communication (NFC).

13. The communication apparatus according to claim 1, wherein the second communication interface shares the identifier with the external apparatus using the second wireless communication.

14. The communication apparatus according to claim 13, wherein the second communication interface includes a Near Field Communication (NFC) tag, and wherein, after the identifier is shared with the external apparatus using the second wireless communication and before the communication using the first wireless communication using the shared identifier is established, the controller performs control to generate a new identifier and write the new identifier in a recording area of the Near Field Communication (NFC) tag.

15. The communication apparatus according to claim 1, wherein the first communication interface generates a network using the first wireless communication by broadcasting a beacon using the identifier.

16. The communication apparatus according to claim 1, wherein in a case where the second wireless communication with the external apparatus is disconnected while the first wireless communication with the external apparatus is established, the first wireless communication with the external apparatus is maintained.

17. A control method for a communication apparatus including a first communication interface configured to communicate with an external apparatus through a network using a first wireless communication and a second communication interface configured to communicate with the external apparatus using a second wireless communication, which is different from the first wireless communication, the control method comprising:

accepting an instruction for communicating with the external apparatus using the first communication interface; and controlling the communication with the external apparatus using the first communication interface, wherein in a case where the communication with the external apparatus is performed using the first wireless communication in response to acceptance of the instruction by a predetermined operation, the first communication interface is controlled to communicate with the external apparatus with an identifier that is different for each connection, wherein in a case where the communication with the external apparatus is performed using the first wireless communication in response to the communication with the external apparatus by the second communication interface, the first communication interface is controlled to communicate with the external apparatus with a predetermined identifier for each connection, wherein the identifier that is different for each connection includes a common character string, and wherein the identifier to be used in the case where the communication with the external apparatus is performed using the first wireless communication in response to acceptance of the instruction with the predetermined operation, and the identifier used in the case where the communication with the external apparatus is performed using the first wireless communication in response to the communication with the external apparatus by the second communication interface include the common character string.

18. A non-transitory computer-readable storage medium storing computer executable instructions that cause a communication apparatus including a first communication interface configured to communicate with an external apparatus through a network using a first wireless communication and a second communication interface configured to communicate with the external apparatus using a second wireless communication, which is different from the first wireless communication, to execute a control method, the control method comprising:

accepting an instruction for communicating with the external apparatus using the first communication interface; and controlling the communication with the external apparatus using the first communication interface, wherein in a case where the communication with the external apparatus is performed using the first wireless communication in response to acceptance of the instruction by a predetermined operation, the first communication interface is controlled to communicate with the external apparatus with an identifier that is different for each connection, wherein in a case where the communication with the external apparatus is performed using the first wireless communication in response to the communication with the external apparatus by the second communication interface, the first communication interface is controlled to communicate with the external apparatus with a predetermined identifier for each connection, wherein the identifier that is different for each connection includes a common character string, and wherein the identifier to be used in the case where the communication with the external apparatus is performed using the first wireless communication in response to acceptance of the instruction with the predetermined operation, and the identifier used in the case where the communication with the external apparatus is performed using the first wireless communication in response to the communication with the external apparatus by the second communication interface include the common character string.

* * * * *